United States Patent [19]

Ellis et al.

[11] 3,870,756

[45] Mar. 11, 1975

[54] PROCESS FOR THE MANUFACTURE OF N,N-DIETHYL-M-TOLUAMIDE BY AQUEOUS CAUSTIC PROCEDURE

[75] Inventors: Leonard C. Ellis, Chesapeake; Mearl A. Kise, Portsmouth, both of Va.

[73] Assignee: Virginia Chemicals Inc., Portsmouth, Va.

[22] Filed: Nov. 17, 1972

[21] Appl. No.: 307,619

Related U.S. Application Data

[63] Continuation-in-part of Ser. No. 84,157, Oct. 26, 1970, abandoned.

[52] U.S. Cl. .............................................. 260/558 A
[51] Int. Cl. .......................................... C07c 103/34
[58] Field of Search ............................. 260/558, 77

[56] References Cited
UNITED STATES PATENTS

| | | | |
|---|---|---|---|
| 2,684,969 | 7/1954 | Krems et al. | 260/561 |
| 2,995,604 | 8/1961 | Phalen | 260/558 |

OTHER PUBLICATIONS

Mandelbaum, Khim. Prom., p. 686–90 (1961).
Frankland, J. Chem. Soc., vol. 12, p. 1309–11 (1896).

Primary Examiner—Harry I. Moatz
Attorney, Agent, or Firm—J. Gibson Semmes

[57] ABSTRACT

A process for the preparation of the insect repellent N,N-diethyl-m-toluamide, commonly referred to as DEET, by an aqueous caustic procedure. Aqueous caustic is utilized for solvent action herein, resulting in the simultaneous liberation of diethylamine from its hydrochloride salt. This eliminates the need for excesses of diethylamine during the amidation step. The present process is carried out to achieve a good yield in the absence of an organic solvent, the aqueous caustic system being employed at temperatures up to 55°C. under ordinary conditions and up to temperatures in the range of 70°C. in a closed vessel of sufficient strength to withstand a mild increase in pressure. Essential to the success of the process are high reaction temperatures in the formation of the acid chloride and the subsequent alternate fractional additions of the caustic and the acid chloride. By this novel aqueous caustic procedure:

A. high yields are obtainable with practically no excess of diethylamine;
B. agitation is facilitated;
C. no solvent is required nor is its recovery necessary;
D. the reaction temperature has been raised to a more convenient range — resulting in an absence of free toluic acid; and,
E. water content of the final mixture is less than 40 percent.

3 Claims, No Drawings

PROCESS FOR THE MANUFACTURE OF N,N-DIETHYL-M-TOLUAMIDE BY AQUEOUS CAUSTIC PROCEDURE

REFERENCE TO RELATED APPLICATIONS

This is a Continuation-in-Part of abandoned Patent application Ser. No. 84,157 entitled PROCESS FOR THE MANUFACTURE OF N,N-DIETHYL-m-TOLUAMIDE BY AQUEOUS CAUSTIC PROCEDURE, filed Oct. 26, 1970 in the names of the same inventors.

BACKGROUND OF THE INVENTION

1. Field Of The Invention

In accordance with available data DEET or DETA is perhaps the most effective and long-acting repellent of insects for use by humans. When applied to the skin or clothing, its effectiveness is such as to repel mosquitoes, sand flies, gnats, chiggers, ticks, deer flies, and fleas. Advantages through the use of the product herein which contains a minimum of 95 percent of the meta isomer, the most effective form of diethyltoluamide, are as follows: The repellent is effective regardless of geographic location; it is not greasy and has excellent resistance to sweating and wash off; it may be applied in either lotion or aerosol form. The product is commercialized as diethyltoluamide (DEET) under the following specifications:

| | |
|---|---|
| Purity Wt. % Min. (Meta Isomer) | 95.0 |
| Color APHA Max. | 100 |
| Specific Gravity 25/25°C. | 0.992–0.999 |
| Water Wt. % Max. | 0.3 |
| Refractive Index 25°C. | 1.5200–1.5235 |
| Acid Number Max. | 0.15 |
| Odor | Bland |
| Molecular Weight | 191.26 |
| Flash Point °C. (Open cup) | 150 |
| Boiling Point °C., 7600mm. | 285 |
| Pour Point °C. | −45 |

2. DESCRIPTION OF THE PRIOR ART

In the art, DEET has been prepared through the reaction of m-toluoyl chloride and diethylamine in the presence of aqueous caustic but there, significantly, the temperature had to be maintained between 0°–20°Centigrade and a solvent such as dichloroethane employed. Such processes are extraordinarily expensive because the low temperature requirement demands the use of refrigeration equipment to maintain a desirable temperature range during the strongly exothermic amidation step. Secondly, the economics are further affected by the necessity for solvent recovery and subsequent solvent loss.

Distinguishable are of interest includes:
U.S. Pat. No. 2,995,604, Phalon;
U.S. Pat. No. 2,411,434, Katzman;
U.S. Pat. No. 2,684,969, Krems, et al
N. N. Maxim, Bull. soc. Chim. Romania, 11, 29–36 (1929).
Fatty Acids, 2nd Edition, K. S. Markley, Ed., Interscience Publishers, Inc., New York, 1961, pp. 1,130–1,132.
V. V. Katyshkina and M. Ya. Draft, Zhur. Obschchei Khim, 29, 63–68 (1959); Chem. Abst. 53, 21632b.
Ya. A. Mandelbaum and KH. E. Khcheyan, *Khim. Prom.*, 1961, 686–90.

SUMMARY OF THE INVENTION

A process has been created for manufacturing N,N-diethyl-m-toluamide in which there is avoidance of the usual requirement for recovering either excess diethylamine or solvent or for utilizing refrigeration equipment. In the method herein, meta-toluic acid and phosphorus trichloride are fully reacted initially by the addition of heat and then the resulting metatoluoyl chloride is added in part to diethylamine. Thereafter, an aqueous caustic of 25 percent to 50 percent strength is added, which immediately reacts with the by-product diethylamine hydrochloride to revert the amine and form sodium chloride, and the prepared m-toluoyl chloride is alternately added fractionally so that there is an avoidance of exposure of meta-toluoyl chloride to free caustic. The effect is to maintain portions of diethylamine free for further reaction with meta-toluoyl chloride, thereby preventing agitation problems normally attributed to the solid amine salts. One of the most significant contributions herein resides in the limitation of contact between the meta-toluoyl chloride and the preferred caustic, sodium hydroxide, thereby significantly decreasing reversion of the acid chloride to metatoluic acid and augmenting the amidation yield to within the 90 percent range.

DESCRIPTION OF THE PREFERRED EMBODIMENTS

Essentially this is a controlled process to produce N,N-diethyl-m-toluamide by the reaction of a carefully prepared acid chloride and an amine. The specific reaction process requires subsequent alternate additions of caustic at various points during the feeding of the prepared acid chloride to diethylamine. Meta-toluic acid, phosphorus trichloride, diethylamine and sodium hydroxide are thus reacted at an equivalent ratio of 1.0:1.5:1.05:1.5, respectively, the caustic being added in slugs at various stages during the acid chloride-amine reaction rather than in toto initially. In general, the initial reaction temperature in forming the acid chloride must exceed 40°C. up to 130°C. for assurance that unreacted meta-toluic acid will be eliminated. Fortuitously water content of the final reaction mixture varies at from 17 – 38 weight percent. The following specific procedures apply to the conduct of successful, economically feasible reactions and subsequent product recovery.

First, the early and complete conversion of the meta-toluic acid to the corresponding acid chloride is essential to avoid problems in the final product recovery step. For example, and as indicated, the reaction temperatures, per se, must be increased from two to three times in excess of 40°C. In practice up to 140°C. is induced. Such high temperatures are required to effect a high conversion to meta-toluoyl chloride without leaving free toluic acid. Otherwise, free acid inhibits crude product recovery through extensive emulsion formation, the net result being lower product yields and a subsequent loss of expensive raw materials.

Secondly, the amidation reactor is charged with the entire portion of diethylamine and subsequently with less than a whole portion of acid chloride or meta-toluoyl chloride while agitating vigorously at a controlled temperature. Sufficient time is allowed for complete reaction of the acid chloride and amine to yield the desired amidation or DEET with subsequent formation of the undesired diethylamine hydrochloride by-product.

Third, the specific alternate additions of caustic soda and toluoyl chloride is critical to the process herein. For example, the absence of large amounts of free caustic soda in the presence of free toluoyl chloride, until the amine reaction is essentially complete, greatly limits the hydrolysis of the toluoyl chloride. In this method about 15-20 percent of the toluoyl chloride is added to the diethylamine until the reaction mass begins to thicken as a result of the diethylamine hydrochloride formation. A calculated portion of the caustic soda solution is then added to liberate the amine from its hydrochloride salt, fluidizing the system and making the amine available for reaction with the said toluoyl chloride. Fresh toluoyl chloride is then added and the cycle is repeated until the reaction is complete. By this method, the second reaction mixture is easily agitated throughout the entire reaction step.

Alternate methods of manufacture, not within the scope of invention, are far less effective, as explained hereinafter. For example, if diethylamine is added to a mixture of toluoyl chloride and caustic soda solution there will result a considerable reversion of the acid chloride back to toluic acid through a competing reaction with the caustic soda, all resulting in a corresponding loss in yield of the amide. If, on the other hand, the toluoyl chloride is added to a mixture of diethylamine and caustic soda solution, the free caustic soda will compete with the diethylamine for the acid chloride producing a corresponding decrease in yield of the amide. Moreover, if an attempt is made to add the toluoyl chloride in toto to the diethylamine with subsequent addition of caustic soda salts, the reaction mass becomes too highly viscous for adequate agitation after 20-25 percent of the acid chloride has been added. Therefore, as stated, it is critical herein that alternate additions of the caustic soda and acid chloride be undertaken as set forth hereinafter. See TABLE I and the following example.

Fourth, the use of a limited amount of water is critical for efficiency of operation hereunder. Depending upon the strength of the caustic used, the water content in the final reaction mixture reaches only 17 to 38 weight percent whereas the prior art reports up to 94 weight percent water in the final reaction mixture. Thus, the significant diminution in quantity of water herein reduces the side reaction of hydrolysis of the toluoyl chloride back to toluic acid, resulting in better product yields and in the elimination of serious emulsion problems during the recovery procedure. Additionally, no salt is required herein to obtain the separation of the crude product from the aqueous phase. In terms of pure economics, the present decreased water volume greatly increases the productivity per given reactor volume.

DEET prepared via the reaction of m-toluoyl chloride and diethylamine in the presence of aqueous caustic through this process shows yields as high as 90% with an insignificant excess of diethylamine. As indicated, agitation was vastly simplified over known processes; no solvent recovery was necessary. A further objective of the process resides in limiting the contact between m-toluoyl chloride and sodium hydroxide, the result of which, as explained, significantly decreased the reversion of the acid chloride to m-toluic acid and enhanced the amidation yield. In lieu of expensive extraction solvents and ultimate distillation thereof, only minimum heating from 50° to a range of 70°-75°C. is required for separation of the product layer.

By reference to TABLE I certain specific reactions are set forth in detail, a specific example being delineated thereafter.

TABLE I

Preparation of Deet - Aqueous Caustic Runs

| Reaction No. | Equivalent Ratio MTA:PCl$_3$:DEA:NaOH | Amidation Temp.,°C. | Strength of NaOH Soln. Added | % of Reactants Added at Various Holds[1] | | Yield Based on- | |
|---|---|---|---|---|---|---|---|
| | | | | % RCOCl | NaOH | G.C. Anal. (Org. Crudes) | Dist'n Cuts |
| 701-126 | 1.0:1.5:1.05:1.41 | 30-52 | 50% | — | 100%[3] | 84.5% | — |
| 701-124 | 1.0:1.5:1.05:1.46[2] | 28-36 | 22.6% | — | 100%[3] | 67.2% | — |
| 701-120 | 1.0:1.5:1.05:1.46[2] | 28-51 | 22.6% | — | 100%[3] | 73.4% | 73.4% |
| 701-139 | 1.0:1.5:1.05:1.50 | 20-52 | 50% | — | 100%[3] | 84.0% | — |
| 701-128 | 1.0:1.5:1.05:1.50 | 22-53 | 50%[4] | — | 100%[3] | 77.4% | — |
| 701-141 | 1.0:1.5:1.05:1.50 | 26-50 | 25% | 20% | 17% | 89.5% | 85.0% |
| | | | | 47% | 40% | | |
| | | | | 70% | 100% | | |
| | | | | 90% | — | | |
| | | | | 100% | — | | |
| 701-136 | 1.0:1.5:1.05:1.50 | 23-54 | 25% | 23% | 16% | 90.2% | — |
| | | | | 50% | 43% | | |
| | | | | 70% | 100% | | |
| | | | | 88% | — | | |
| | | | | 100% | — | | |
| 701-131 | 1.0:1.5:1.05:1.50 | 24-53 | 50% | 23% | 21% | 93.0% | 86.3% |
| | | | | 50% | 30% | | |
| | | | | 71% | 45% | | |
| | | | | 91% | 95% | | |
| | | | | 100% | 100% | | |

[1] Upon the addition of about 20%, 50%, 70%, 90% and 100% of the m-toluoyl chloride charge, the reaction was allowed to stir and react for a 10-20 minute period. The caustic was then introduced rapidly, followed by another 10-20 minute holding period to insure complete liberation of the diethylamine. There were no holding periods in runs 701-120, 701-124, 701-126, and 701-128.
[2] Of the caustic added, 0.37 equivalents were added during the work-up.
[3] The entire caustic charge was added before the acid chloride addition was begun.
[4] In order to obtain suitable agitation, enough water had to be added to drop overall caustic concentration to 25.6% during the amidation.

The effect of caustic soda in the presence of meta-toluoyl chloride is illustrated above, the yield of DEET being considerably less when caustic soda is added initially or is present in an exposed or free state. See note 3, Table I.

EXAMPLE:

Procedure

1. To prepare the intermediate, m-toluoyl chloride, the reaction flask was charged with 6.0 equivalents of m-toluic acid and 9.0 equivalents of phosphorus trichloride and heated without agitation. Upon reaching 65°C. agitation was begun and continued throughout the temperature rise to 90°C. Here the agitation was stopped and a two hour reaction period begun. Throughout the reaction period, phosphorous acid was drained off as formed to prevent reaction with phosphorus trichloride.

2. At the conclusion of the two hour reaction period at 90°C., the agitation was resumed and the reaction temperature raised to 130°C. and maintained for 20 minutes. This higher temperature aids in completing the reaction of phosphorus trichloride and m-toluic acid, thereby reducing quantities of m-toluic acid in the crude amidation product which would cause considerable difficulty during product recovery. The crude product, m-toluoyl chloride, was suitable for amidation with diethylamine.

3. The amidation reactor was then charged with 3.06 equivalents of diethylamine. Crude m-toluoyl chloride was fed into the diethylamine at approximately 6 grams per minute while agitating very vigorously. Cooling water was required to hold the temperature in the 20°C. to 55°C. range. Continue the feeding of acid chloride until 20 percent to 25 percent has been added. The viscosity of the reaction mixture then gradually increases. When agitation became difficult, consistently in the 20–25 percent range, the acid chloride feed was halted but strong agitation was continued while allowing the mixture to further react during a 10 minute holding period.

4. At this point about 17 percent of the 25 percent aqueous caustic solution was added to the mixture and the resultant system held for 10 minutes. This holding period allowed sufficient time for reaction of the caustic with the diethylamine hydrochloride, eliminating possible reaction between the caustic and fresh, incoming acid chloride. The viscosity of the reaction mixture was decreased greatly and two layers were sometimes observed.

5. Resume the acid chloride addition while maintaining the same temperature control. Continue until 50 percent has been added. Again observing a 10 minute holding period and then resuming the addition of 25 percent aqueous caustic until 43 percent has been added.

6. Continue alternating the addition of acid chloride and 25 percent aqueous caustic, stopping at 70 percent, 88 percent and 100 percent points for the acid chloride and adding 100 percent of the caustic solution after reaching the 70 percent level for the acid chloride. The feedrate was reduced to about 3 grams per minute during addition of the last 12 percent of m-toluoyl chloride.

7. Maintain the reaction mixture at the reaction temperature and stir vigorously for 30 minutes.

8. As the final reaction mixture contains only 17 percent to 38 percent water, the crude product mixture was heated to 70°–75° C. and separated off the bottom aqueous layer as waste.

9. Fractionate the crude organic layer to recover the finished DEET product.

We claim:

1. A method in the preparation of N,N-diethyl-m-toluamide comprising:
   A. first reacting meta-toluic acid with phosphorus trichloride while simultaneously draining waste products and thereafter substantially raising the reaction temperature to the range of 90°–140°C. to complete conversion of the acid in the reaction to yield meta-toluoyl chloride;
   B. secondly, charging an amidation reactor with an entire charge of diethylamine, thereafter gradually feeding portions of the meta-toluoyl chloride into the reactor while agitating same, thereby forming the N,N-diethyl-m-toluamide and the by-product diethylamine hydrochloride;
   C. thirdly, forming an aqueous solution of caustic soda having a concentration up to and including 50 percent and continuously alternating: the addition to the by-product of portions of said caustic solution, with the addition of portions of fresh meta-toluoyl chloride, to form by said additions a reaction mixture having a water content of less than 40 weight percent; simultaneously maintaining the reaction temperature at 20°–55°C. and agitating said reaction mixture to liberate diethylamine from its hydrochloride salt;
   D. sequentially heating the product mixture at 70°–75°C. to yield a crude organic product layer of N,N-diethyl-m-toluamide.

2. The method according to claim 1 in which the meta-toluic acid, phosphorus trichloride, diethylamine, and aqueous caustic are in equivalent ratios respective of 1.0:1.5:1.05:1.50.

3. The method according to claim 1 in which the caustic comprises sodium hydroxide solution.

* * * * *